(12) United States Patent
Bidarkar et al.

(10) Patent No.: US 10,007,543 B2
(45) Date of Patent: Jun. 26, 2018

(54) CACHING GRAPHICS OPERATION OUTPUTS

(71) Applicant: VMware, Inc., Palo Alto, CA (US)

(72) Inventors: Rishi Bidarkar, Sunnyvale, CA (US); Hari Sivaraman, Livermore, CA (US); Banit Agrawal, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 219 days.

(21) Appl. No.: 14/309,794

(22) Filed: Jun. 19, 2014

(65) Prior Publication Data
US 2015/0370589 A1    Dec. 24, 2015

(51) Int. Cl.
G06F 9/455    (2018.01)
G06F 12/0802    (2016.01)

(52) U.S. Cl.
CPC ...... G06F 9/45558 (2013.01); G06F 12/0802 (2013.01); *G06F 2009/45583* (2013.01); *G06T 2200/28* (2013.01)

(58) Field of Classification Search
CPC ....... G06T 15/005; G06T 15/00; G06T 15/80; H04L 9/3236; G06F 9/45533; G06F 12/0871; G06F 3/064
See application file for complete search history.

(56) References Cited

U.S. PATENT DOCUMENTS 7,809,888 B1 * 10/2010 Clark ................. G06F 12/0871
                                                    711/118
2014/0337835 A1 * 11/2014 Johnson .............. G06F 9/45558
                                                    718/1

FOREIGN PATENT DOCUMENTS

WO    WO 2013178244 A1 * 12/2013 ......... G06F 9/45533

OTHER PUBLICATIONS

Vignesh T. Ravi et al., Supportin GPU Sharing in Cloud Environments with a Transparent Runtime Consolidation Framework, ACM, 2011, retrieved online on Aug. 5, 2017, pp. 217-228.*
Yoon Suk Lee et al., An Input-Process-Output Model of Shared Understanding in Partially Distributed Conceptual Design Teams, ACM, Feb. 2013, pp. 183-186, retrieved online Feb. 23, 2018 from URL: <https://dl.acm.org/citation.cfm?id=2442001>.*

* cited by examiner

*Primary Examiner* — Hanh T Bui
(74) *Attorney, Agent, or Firm* — Nicholson De Vos Webster & Elliott LLP

(57) ABSTRACT

Exemplary methods, apparatuses, and systems receive a first instruction set from a first virtual machine (VM), the first instruction set including a request to perform an operation on an input. A first identifier is generated based upon the operation and the input. The first identifier is mapped to a stored copy of the input, the operation, and an output resulting from a processor performing the operation. In response to receiving a second instruction set from a second VM, a second identifier is generated based upon the input and operation received within the second instruction set. In response to determining that the second identifier matches the stored first identifier, it is further determined that the input and operation of the first instruction set matches the input and operation of the second instruction set. A copy of the stored output is returned to the second VM.

20 Claims, 4 Drawing Sheets

CACHING GRAPHICS OPERATION OUTPUTS

FIELD OF THE INVENTION

The various embodiments described herein relate to a host computer caching graphics operations. In particular, embodiments relate to virtualization software of a host computer identifying and reusing cached graphics operation outputs.

BACKGROUND OF THE INVENTION

Virtual machines (VMs) running on a host computer may use one or more processing units to perform graphics operations. Various virtual devices are presented to each VM by the underlying virtualization software. For example, the virtualization software may present a virtual graphics processing unit (or "VGPU") to a VM. The VGPU is a software abstraction of a physical graphics processing unit ("GPU") device. The functionality of the VGPU is defined by software routines that are a part of the virtualization software as well as any physical devices, such as physical, or host GPUs (or "HGPUs") and associated drivers that support the VGPU operation. The virtualization software can be viewed as a layer of indirection, wherein VGPU requests from the VM are received by the virtualization software and redirected to a host GPU.

VMs running on the host may request that the processing unit(s) perform identical operations on graphics resources. For example, multiple VMs may submit identical requests to compile a shader, fetch a texture, encode a bitmap, compress a bitmap, or perform another set of one or more operations on the same data. The VMs, however, share the processing units in a manner that is transparent to each of the VMs. In other words, the VMs do not know which graphics operations and data are being sent to the processing unit(s) by other VMs. As a result, redundant graphics operations are sent to and executed by the processing unit(s).

SUMMARY OF THE INVENTION

Exemplary methods, apparatuses, and systems include a resource manager of a host computer receiving a first instruction set from a first virtual machine (VM). The first instruction set includes a request to perform an operation on an input. The resource manager generates a first identifier for the first instruction set based upon the input and the operation. For example, the resource manager may hash the input and operation. The resource manager instructs a processing unit to perform the operation on the input. The resource manager receives an output from the processing unit resulting from the processing unit performing the operation on the input. The resource manager maps the first identifier to a stored copy of the input, the operation, and the output. The resource manager returns the output to the first VM in response to receiving the first instruction set. The resource manager receives a second instruction set from a second VM. The second instruction set also includes the input and the request to perform the operation on the input. The resource manager generates a second identifier for the second instruction set based upon the input and the operation received within the second instruction set. The resource manager determines that the second identifier matches the stored first identifier. In response to the determination that the second identifier matches the stored first identifier, the resource manager determines that the input and operation of the first instruction set matches the input and operation of the second instruction set. The resource manager returns a copy of the stored output to the second VM in response to receiving the second instruction set and the determination that the input and operation matches between the first and second instruction sets.

In one embodiment, one or more operations are treated independently of other operations, which are treated in blocks or groups. For example, operations such as assembling a shader, compiling a shader, preprocessing a shader file, retrieving information about a given image file, loading a surface from a file, loading a volume from a file, creating a texture from a file, fetching a texture, encoding a bitmap, and compressing a bitmap may each be treated separately. As a result, a different identifier or hash value is generated for each. Other operations, however, may be grouped into blocks of operations and an identifier or hash value is generated for each block. For example, operations that may be grouped include, but are not limited to, operations to render primitives, create resources, create shaders, create textures, update a surface or texture, work with system-level variables, adjust gamma ramp levels, work with palettes, manipulate volume resources, manipulate texture resources, query and prepare surfaces, add references, request the available texture memory, render a sequence of primitives, create a render-target surface, fill an area of a surface with a color, set light properties, draw a patch, manipulate a swap chain, etc.

In one embodiment, the first instruction set includes a sequence of blocks of code that result in a compressed bitmap. The resource manager generates an identifier for each block in the sequence of blocks from the first instruction set and stores a mapping between the sequence of identifiers and a stored copy of the compressed bitmap. As the resource manager generates identifiers for each block in a sequence of blocks from the second instruction set, the resource manager compares the identifiers between the instruction sets and determines if the second instruction set has a matching sequence of operations to the first instruction set. While blocks are determined to match, and prior to completing the sequence of the second instruction set, the blocks of operations from the second instruction set are stored until the resource manager determines the sequence of the second instruction set to be a hit or a miss. If the sequence of blocks from the second instruction set matches the first instruction set, the resource manager returns a copy of the stored compressed bitmap. If the sequence of blocks from the second instruction set does not match the first instruction set, the resource manager instructs the processor to perform the stored copies of the blocks.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include multiple VMs running on a host computer sharing a single cache to store and commonly reuse output data for, e.g., three-dimensional (3D) graphics. Embodiments include a host computer resource manager generating a hash or other identifier for each set of one or more operations and input received from virtual machines (VMs) running on the host computer. If the identifier does not match a previously generated identifier, the resource manager instructs a processor to perform the operation and returns the output from the processor to the VM. The resource further maps the identifier to a stored copy of the input, operation, and output. If the identifier matches a previously generated identifier, the resource manager returns a copy of the stored output that is mapped to the matching identifier. As a result, the resource manager saves processing resources by using cached outputs rather than requesting the redundant performance of operations.

Figure 1:
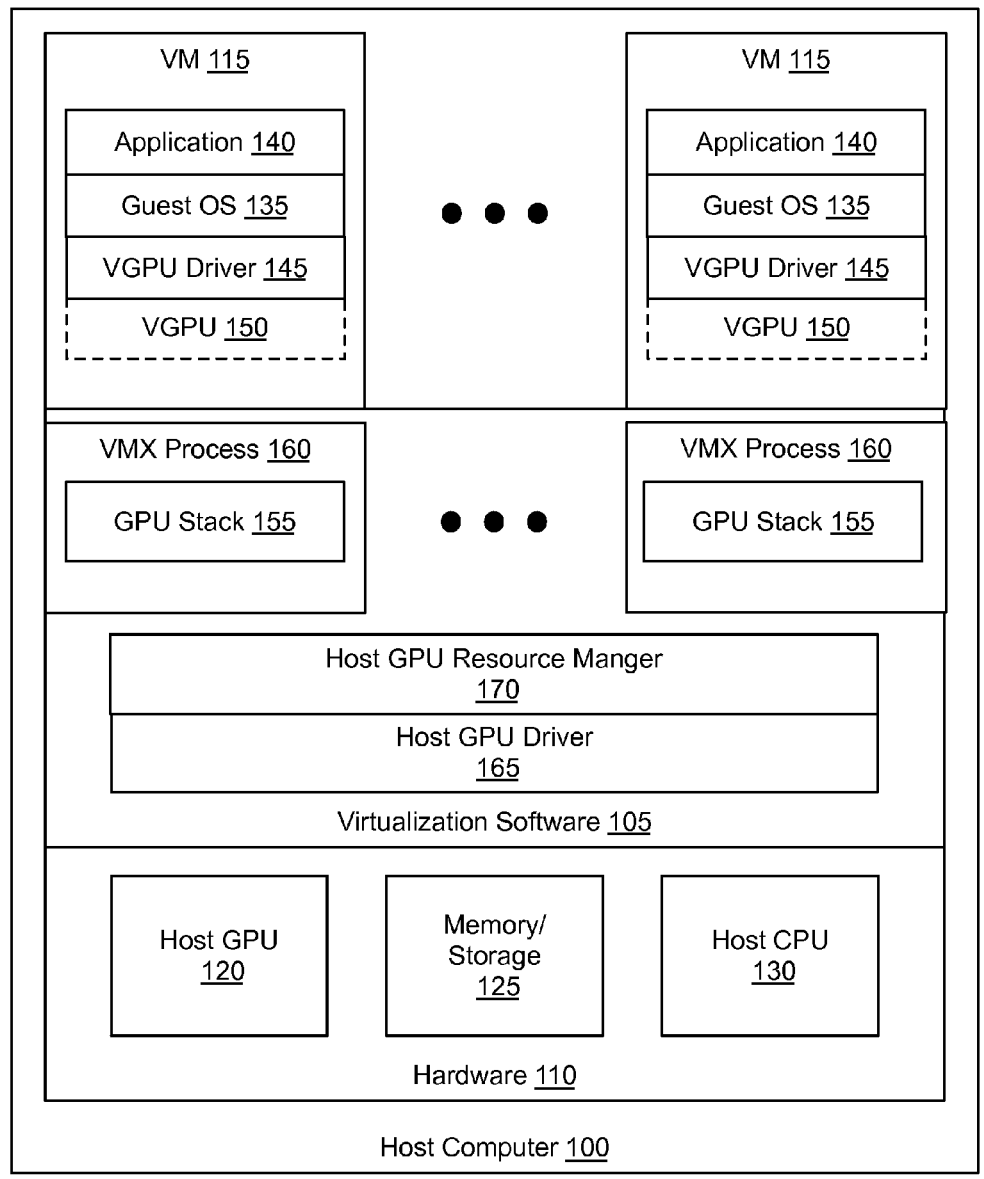
FIG. 1 illustrates, in block diagram form, an exemplary virtual datacenter environment including one or more networked processing devices implementing the identification and reuse of cached graphics operation outputs.

FIG. 1 illustrates, in block diagram form, an exemplary host computer 100 implementing the identification and reuse of cached graphics operation outputs. A virtualization software layer 105 (e.g., a hypervisor) running on hardware 110 of host computer 100 manages multiple VMs 115. Virtualization software layer 105 manages physical resources, e.g., hardware 110, as well as maintains virtual-to-physical hardware mappings.

Hardware 110 includes physical devices, such as a host graphics processing unit (host GPU) 120, memory 125, and one or more host central processing units (host CPU or HCPU) 130. Host GPU 120, memory 125, and host CPU 130 are communicatively coupled to one another (not shown). In one embodiment, memory 125 includes a cache (referred to herein as GPU memory), which is accessible to VMs 115 and may be used to store the outputs from graphic operations. For example, VMs 115 running on host computer 100 may utilize one or more specialized application programming interfaces (APIs) to generate 3D graphics. As used herein, the graphics operations may refer to one or more API calls that enable 3D graphics by providing access to the host CPU and/or host GPU in an abstract way. As described in more detail herein, a graphics operation output may be stored in host GPU memory and shared by multiple VMs 115. For example, the output of one or more operations performed by host GPU 120 or host CPU 130 for a first VM 115 is stored in host GPU memory. Virtualization software 105 may later identify the operation output as being stored in host GPU memory in response to a second VM 115 requesting the performance of the same operation(s) on the same input data. As a result, the output is shared between the first and second VMs 115 and the host GPU 120 or host CPU 130 is spared from performing a redundant operation.

VMs 115 are complete computation environments, containing virtual equivalents of the hardware and system software components of a physical system and are typically implemented by the virtualization infrastructure, which includes a variety of software and hardware components described herein. Each VM 115 includes a guest operating system 135 upon which application(s) 140 run. Additionally, VMs 115 include virtual device drivers to provide access to virtual devices. For the sake of simplicity, only virtual GPU (VGPU) driver 145 and VGPU 150 are shown. Each VM 115, however, may include a variety of virtual device drivers and virtual devices including virtual disks, memory, network interfaces, etc. VGPU 150 is illustrated with a dashed boundary to indicate that it is a software abstraction of a physical device and, while it is conceptually part of VM 115, VGPU 150 is implemented using GPU stack 155 (e.g., as described below).

Virtualization software 105 creates one or more threads or processes, such as virtual machine executable (VMX) process 160, for each VM 115. VMX process 160 is responsible for handling GPU stack 155 input and output. For example, guest software, such as guest operating system 135 and application(s) 140, generates requests for the performance of various graphics operations. The guest software sends software function calls for the graphics operations to VGPU 150. For example, guest operating system 135 may send device driver interface (DDI) calls that use VGPU resources to VPGU driver 145. VPGU driver 145 translates those calls and sends the translated calls to VGPU 150.

As mentioned above, VGPU 150 is an abstraction of a physical device that is provided to VM 115 by GPU stack 155. From the perspective of software executing within virtual machine 115, VGPU 150 behaves as a physical device present within the context of the virtual machine. The functionality of VGPU 150, however, is implemented by VMX process 160 and GPU stack 155. VMX process 160, therefore, processes the translated calls from VGPU driver 145 using GPU stack 155.

VMX process 160 receives the translated calls and manages host GPU resources for VM 115. In one embodiment, VMX process 160 validates the calls, initializes a connection with a host GPU driver 165 for processing of the graphics operations, and, if applicable, translates the calls from VM 115 into calls for host GPU driver 165. In one embodiment, host GPU driver 165 is an unmodified GPU driver that provides standard GPU driver functionality, which includes passing calls to host GPU 120 and/or host CPU 130 to have the graphics operations performed.

Virtualization software 105 further includes host GPU resource manager 170. Host GPU resource manager 170 receives the translated calls from VMX process 160. For example, as described further herein, a call received by host GPU resource manager 170 may include input data and an operation for host GPU 120 and/or host CPU 130 to perform on the input data. In one embodiment, host GPU resource manager 170 aggregates multiple calls into an instruction set. For example, the rendering of a bitmap may include multiple operations to be performed by host GPU 120 and/or host CPU 130. Additionally, host GPU resource manager 170 may treat a single call as an instruction set or process one or more calls from an instruction set separately from the remainder of the instruction set. As described in further detail below, host GPU resource manager 170 generates identifiers for each call or set of calls. In one embodiment, host GPU resource manager 170 stores a mapping of generated identifiers to stored copies of operations, input, and output within memory 125. When an identifier matches a previously processed call or set of calls, host GPU resource manager 170 utilizes a stored copy of the output from host GPU 120 and/or host CPU 130 rather than instructing host GPU 120 and/or host CPU 130 to perform one or more redundant operations.

While FIG. 1 shows one particular virtualization configuration as an example, the components and methods described herein may be adapted for other virtualization configurations. For example, host GPU driver 165 and resource manager 170 may reside in a special appliance VM (sometimes referred to as "Domain 0" or a "root partition")

that has direct access to physical devices. The term "virtualization software" as used herein includes any software that effectuates machine virtualization regardless as to where it resides.

Figure 2:
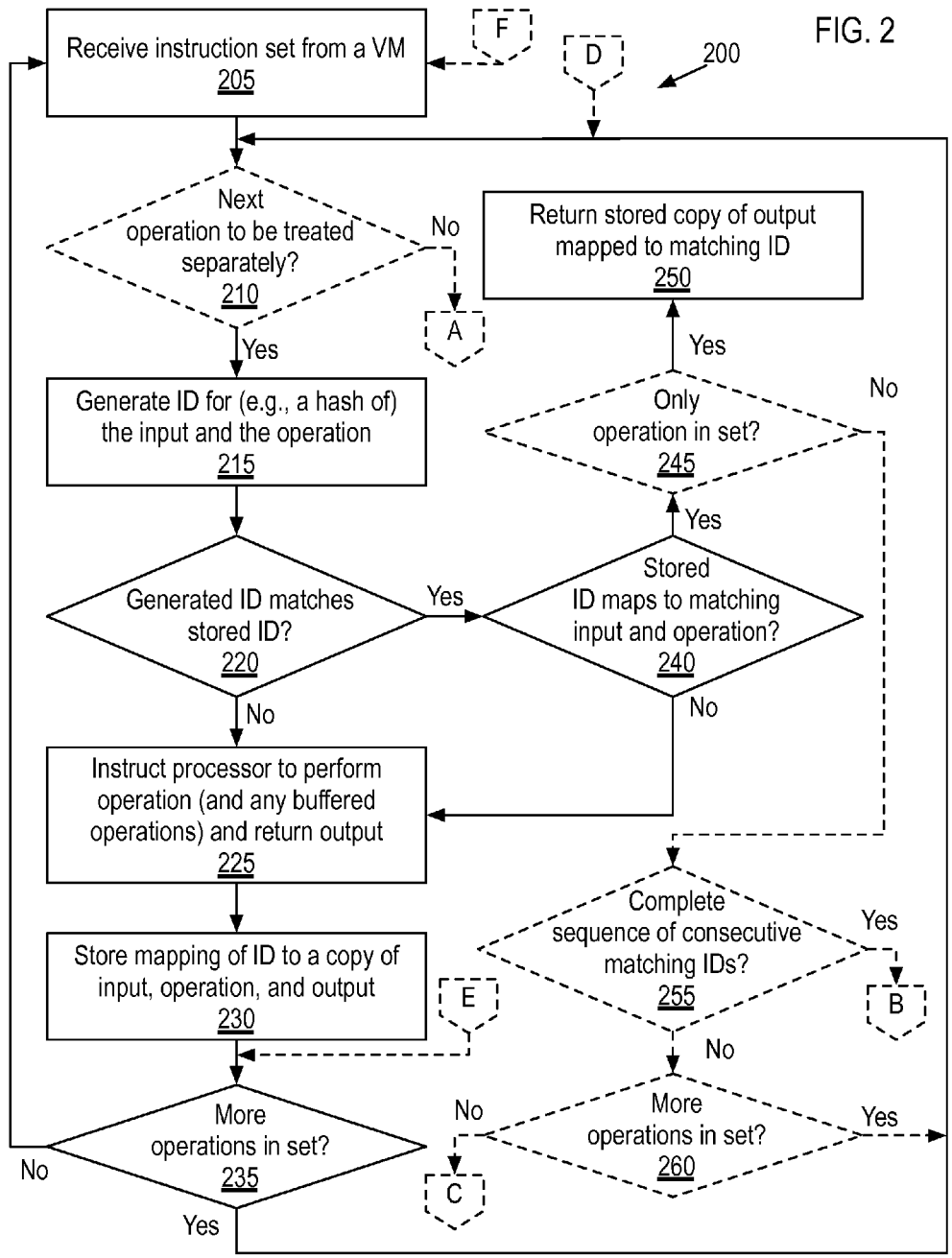
FIG. 2 is a flow chart illustrating an exemplary method of identifying and reusing cached graphics operation outputs.

FIG. 2 is a flow chart illustrating exemplary method 200 of identifying and reusing cached graphics operation outputs. At block 205, resource manager 170 receives an instruction set including one or more operations from a VM. For example, an instruction set may include an API call or other request to compile a shader, assemble a shader, preprocess a shader file, retrieve information about a given image file, load a surface from a file, load a volume from a file, create a texture from a file, fetch a texture, encode a bitmap, compress a bitmap, or otherwise perform one or more operations to render a bitmap. While the embodiments described herein refer to graphics operations, embodiments of method 200 may be performed with other processing unit operations.

At block 210, resource manager 170 optionally determines if the next operation within the received instruction set is to be treated separately. In one embodiment, resource manager 170 utilizes individual operations to generate and determine matching identifiers for the reuse of cached outputs. For example, particular operation or operation types may be flagged for individual identifier generation and comparison. Operations such as assembling a shader, compiling a shader, preprocessing a shader file, retrieving information about a given image file, loading a surface from a file, loading a volume from a file, creating a texture from a file, fetching a texture, performing a type of encoding (e.g., encoding a bitmap), or performing a type of compression (e.g., compressing a bitmap) may be treated independently. Alternatively, resource manager 170 utilizes groups or blocks of operations to generate and determine matching identifiers for the reuse of cached outputs. In yet another embodiment, resource manager 170 utilizes both individual operations and groups or blocks of operations to generate and determine matching identifiers for the reuse of cached outputs. For example, operations such as a request to compile a shader, fetch a texture, perform a type of encoding, or perform a type of compression may be treated independently while other rendering operations are grouped into blocks (as described further herein). Exemplary operations that may be treated in groups (i.e., not be treated independently) include, but are not limited to, operations to render primitives, create resources, create shaders, create textures, update a surface or texture, work with system-level variables, adjust gamma ramp levels, work with palettes, manipulate volume resources, manipulate texture resources, query and prepare surfaces, add references, request the available texture memory, render a sequence of primitives, create a render-target surface, fill an area of a surface with a color, set light properties, draw a patch, manipulate a swap chain, etc.

If the operation is not to be treated separately, method 200 continues via off page connector A to FIG. 3 (described below). Otherwise, at block 215, if the operation is treated independently of other operations, resource manager 170 generates an identifier for the input and the operation. For example, resource manager 170 utilizes a hash function or another algorithm to generate a substantially unique identification of the operation and/or input. In one embodiment, resource manager 170 applies a hash function to a combination of the input and operation. In an alternate embodiment, resource manager 170 applies a hash function to the input and the operation separately. In yet another embodiment, resource manager 170 applies a hash function only to the input.

For example, pixel, vertex, and geometry shaders may be compiled on the host CPU and executed by the host GPU or on the host CPU. The input for this compilation operation includes a reference to a shader file (e.g., a pointer to a string that specifies the filename) and the output includes the compiled shader code. The operation of compiling the shader code is quite time consuming even for simple shaders. To avoid repeating this costly process for the same shader, resource manager 170 indexes compiled shaders within memory 125 by hashing the compilation commands for shaders and corresponding shader files.

Similarly, embodiments provide the benefit of eliminating the recreation of texture data from the same texture file. To avoid recreating textures, resource manager 170 indexes the outputted texture objects by hashing the commands to create a texture and the inputs to create a texture (e.g., references to texture files).

As another example, resource manager 170 may apply a hash function to one or more operations to compress an encoded bitmap. In a virtual desktop environment, the screen image generated by VM 115 is tiled, encoded, and compressed for transmission to the corresponding client device. To avoid redundant compression operations, resource manager 170 indexes the outputted compressed bitmaps by hashing the compression command(s) and corresponding bitmap(s) (e.g., references to the encoded bitmaps).

At block 220, resource manager 170 determines if the generated identifier matches a previously generated and stored identifier. For example, resource manager may store a list, table, or other data structure of identifiers in memory 125 and search the data structure for an identifier that matches the currently generated identifier. In one embodiment, a sequence of identifiers is mapped to the input and output.

If the currently generated identifier does not match a stored identifier, at block 225, resource manager 170 instructs processor(s) 120/130 to perform the operation. Resource manager 170 returns the output from processor(s) 120/130 to the corresponding VMX process 160/VM 115.

In one embodiment, resource manager 170 also instructs processor(s) 120/130 to perform one or more buffered operations. For example, as described below, when operations are grouped into blocks, operations may be buffered until resource manager 170 determines if a sequence of generated identifiers match a corresponding sequence of stored identifiers. Upon determining that a generated identifier within the sequence does not match, the stored operations may be read from the buffer and passed to processor(s) 120/130. At block 230, resource manager 170 stores a mapping of the generated identifier to a copy of the input, operation, and output. Resource manager 170 uses the stored mapping to detect subsequent redundant operations.

At block 235, resource manager 170 determines if there are additional operations within the received instruction set. If there are no additional operations within the received instruction set, method 200 returns to block 205 to process the next instruction set. If there are additional operations within the received instruction set, method 200 returns to block 210/215 to process the next operation within the instruction set.

If the generated identifier matches a stored identifier, at block 240, resource manager 170 determines if the stored identifier maps to a matching input and operation. For example, the generation of the identifier may result in a substantially unique, but not an absolutely unique identifier.

To verify the result of matching identifiers, resource manager 170 compares the current input and operation with the stored copy of the input and operation mapped to the matching identifier.

If the stored identifier does not map to a matching input and operation, method 200 proceeds to block 225 as described above. If the stored identifier maps to a matching input and operation, at block 245, resource manager 170 optionally determines if the current operation is the only operation in the instruction set. For example, as described above, operations may be handled as a sequence of operations or individually.

At block 250, if the current operation is the only operation in the instruction set or if operations are handled without consideration for previous or subsequent operations in a sequence, resource manager 170 returns a copy of the stored output that maps to the matching identifier. For example, if a request to compile a shader is determined to match a previous request, the previous output of the compiled shader is returned to VMX process 160 instead of instructing processor(s) 120/130 to perform a redundant compilation of the shader.

If the current operation is not the only operation in the instruction set, at block 255, resource manager 170 determines if the current match completes a sequence of consecutive matching identifiers (and their corresponding inputs and operations). For example, resource manager 170 may track the beginning and ending of a sequence of operations used to generate a compressed bitmap. Resource manager 170 compares each operation of the current instruction set (e.g., one at a time or via a sliding window) against the corresponding operations of the tracked sequence. If the current match completes a match for the sequence, method 200 continues via off page connector B to FIG. 3 (described below).

If the current match does not complete the match for the sequence, at block 260, resource manager 170 determines if any operations remain to be evaluated in the instruction set (e.g., to potentially complete the sequence). If additional operations remain, resource manager 170 buffers the copy of the output or mapping to the copy of the output until the sequence matching is complete or results in miss (e.g., to utilize the stored copy of the output for the individually handled operation to return to VMX process 160 in the case of a sequence miss) and method 200 returns to block 210 to process the next operation. If no additional operations remain, method 200 continues via off page connector C to FIG. 3 (described below).

Figure 3:
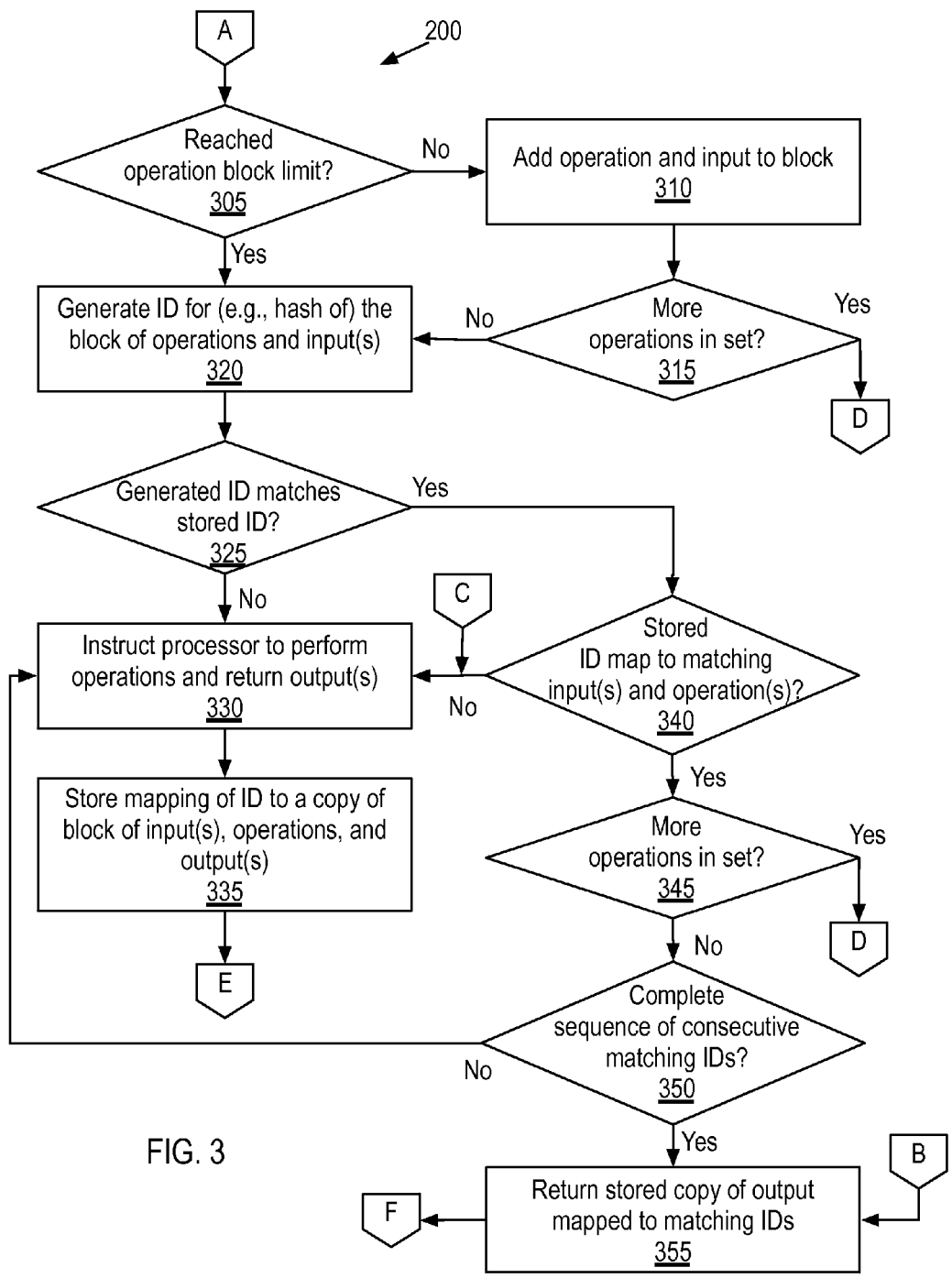
FIG. 3 is a continuation of the flow chart in FIG. 2.

FIG. 3 is a continuation of the flow chart in FIG. 2. Proceeding from off page connector A, at block 305, resource manager 170 determines if the current operation results in a block of operations reaching a block limit. For example, each block of operations may be limited to a threshold number of operations and inputs or to a threshold number of bytes. In one embodiment, blocks are limited to 4096 bytes. For example, bitmaps may be generated by fragments of rendering code (e.g., operations to render primitives, create resources, etc.). In such an embodiment, resource manager 170 indexes each block of 4096 bytes of API calls or other operations using a 16 byte hash index of the block. In one embodiment, a block of operations is truncated when handling an operation that is processed separately, whether or not it has reached the limit.

If the current operation does not result in a block of operations reaching the limit, at block 310, resource manager 170 adds the input and operation to the block of operations. For example, resource manager 170 may store operations and inputs with an indication of their sequence and association to a block of operations in memory 125. At block 315, resource manager 170 determines if there are remaining operations within the instruction set to process. If there are additional operations, method 200 returns to block 210 via off page connector D.

If no additional operations remain within the instruction set or if the block limit has been reached, at block 320, resource manager 170 generates an identifier for the input(s) and the operation(s) of the block of operations. Similar to the individual operation examples described above, resource manager 170 utilizes a hash function or another algorithm to generate a substantially unique identification of the block of operation(s) and/or input(s). In one embodiment, resource manager 170 applies a hash function to a combination of all or a threshold number of the input(s) and operation(s) of the block of operation(s). In an alternate embodiment, resource manager 170 applies a hash function to the input(s) and the operation(s) separately. In yet another embodiment, resource manager 170 applies a hash function only to the input(s).

At block 325, resource manager 170 determines if the generated identifier for the block of operations matches a previously generated and stored identifier for a previous block of operations. For example, resource manager 170 may store a list, table, or other data structure of identifiers in memory 125 and search the data structure for an identifier that matches the currently generated identifier. In one embodiment, resource manager 170 maps a sequence of identifiers to the input(s) and output(s).

At block 330, if the currently generated identifier does not match a stored identifier or if method 200 proceeds via off page connector C, resource manager 170 instructs processor(s) 120/130 to perform the block of operations. Resource manager 170 returns the output from processor(s) 120/130 to the corresponding VMX process 160/VM 115.

In one embodiment, resource manager 170 also instructs processor(s) 120/130 to perform and/or return one or more buffered operations. For example, individual and blocks of operations and matched/mapped outputs for individual operations may be buffered until resource manager 170 determines if a sequence of generated identifiers match a corresponding sequence of stored identifiers. Upon determining that a generated identifier within the sequence does not match, the stored block(s) of operations may be read from the buffer and passed to processor(s) 120/130. The output(s) for the stored block(s) of operations and/or stored copies of matched individual operations may also be returned to the VMX process 160/VM 115.

At block 335, resource manager 170 stores a mapping of the generated identifier of the current block of operations to a copy of the corresponding input(s), operation(s), and output(s). The stored mapping may begin a new sequence or be added to an existing sequence of blocks and/or individual operations. Additionally, if previous separately handled operations or blocks of operations from the instruction set were buffered and/or performed, resource manager 170 stores a mapping of the identifiers to each corresponding block of operations or separately handled operations. As a result, resource manager 170 creates a sequence of identifiers corresponding to a sequence of operations. As described above, resource manager 170 uses the stored mapping to detect subsequent redundant operation requests. Method 200 then continues, via off page connector E, to block 235 described above to determine if there are additional operations within the received instruction set.

If the generated identifier for the block of operations matches a stored identifier, at block 340, resource manager 170 determines if the stored identifier maps to a matching input(s) and operation(s). As described above, the generation of the identifier may result in a substantially unique, but not an absolutely unique identifier. To verify the result of matching identifiers, resource manager 170 compares the current input(s) and operation(s) with the stored copy of the input(s) and operation(s) mapped to the matching identifier.

If the stored identifier does not map to a matching input(s) and operation(s), method 200 proceeds to block 330, described above. If the stored identifier maps to a matching input and operation, at block 345, resource manager 170 determines if any operations remain to be processed in the instruction set. If there are additional operations, method 200 returns to block 210 via off page connector D.

If there are no remaining operations in the instruction set, at block 350, resource manager 170 determines if the current match completes a sequence of consecutive matching identifiers, as described above. If the current match does not complete the match for the sequence, method 200 continues at block 330, described above.

If the current match completes a sequence of matches or if method 200 proceeds via off page connector B, resource manager 170 returns a copy of the stored output(s) mapped to the matching sequence of identifiers. For example, as described above, resource manager 170 may cache a copy of a compressed, encoded bitmap. If the sequence of operations results in rendering and compressing a bitmap that has already been rendered and compressed, resource manager 170 is able to avoid redundant operations. As such, the output corresponding to the sequence may be a compressed and encoded bitmap that resulted from a previous performance of the sequence of operations. Upon completion of the sequence of operations, method 200 returns to block 205 via off page connector F to receive the next instruction set.

Figure 4:
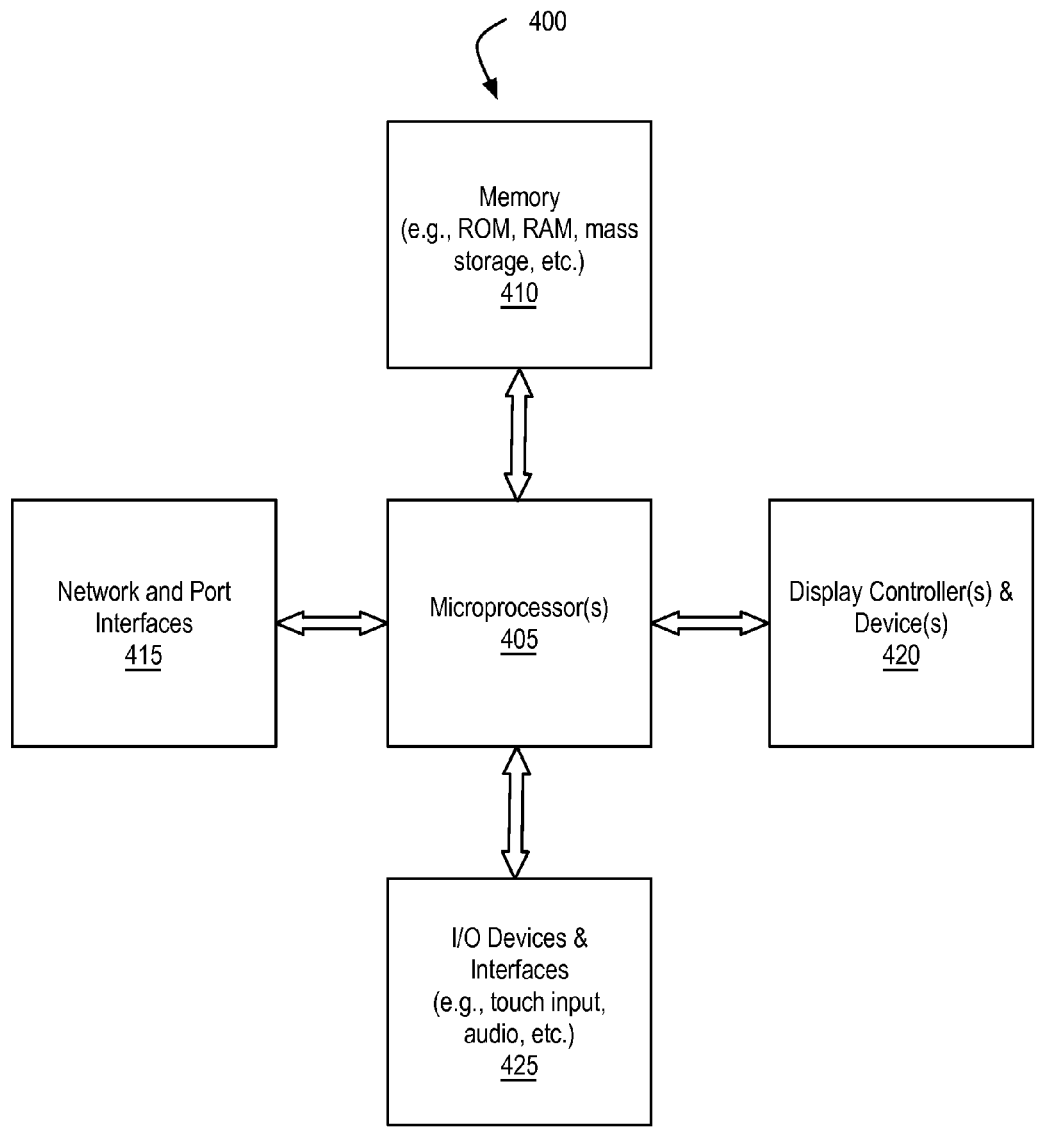
FIG. 4 illustrates, in block diagram form, an exemplary processing system to identify and reuse cached graphics operation outputs.

FIG. 4 illustrates, in block diagram form, exemplary processing system 400 to identify and reuse cached graphics operation outputs as described herein. Data processing system 400 is another exemplary representation of host computer 100 described above. In one embodiment, data processing system 400 includes one or more server or network computers. Alternatively, data processing system 400 may be a personal computer, tablet-style device, an embedded processing device within another device or consumer electronic product, etc. As used herein, the terms computer, device, system, processing system, processing device, and "apparatus comprising a processing device" may be used interchangeably with data processing system 400 and include the above-listed exemplary embodiments.

Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. In one embodiment, memory 410 represents all or a portion of memory 125 described above. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

In one embodiment, data processing system 400 provides server-based computing in a virtual datacenter environment. In such an environment, data processing system 400 allows client devices (not shown) to access centrally managed user virtual desktops, such as those implemented by VMs 115, via one or more network(s) (e.g., a local area network or other private or publically accessible wide area network, such as the Internet). For example, a client device and VM 115 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 115.

The term "desktop," as used herein, refers to a human interface environment through which users can launch, interact with, and manage applications, settings, and/or data, etc. A virtual desktop is a virtual computing system that operates as a desktop or workstation computer with which an end user can interact using a desktop remoting protocol and the software and/or hardware of client device. A virtualized desktop may export user interfaces, e.g., keyboard and mouse input, audio and visual output, to a client device from VM 115 running remotely or locally on the client device, or, in some cases, using a hybrid. The client device transmits user input, e.g., keyboard or mouse input, to VM 115 to be processed, and receives display and other data, such as sound, from VM 115 for presentation to a user of the client device. The client device presents a bitmap representation of the desktop generated by VM 115, e.g., as described herein. Input to and output from the virtualized desktop are reflected in the bitmap representation on the client device as it occurs on the virtualized desktop within VM 115.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented method 200 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. For example, method 200 may be performed only on individual operations, only on blocks of operations, or on a combination of the two. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method of sharing graphics operation outputs among a plurality of virtual machines running on a host machine, comprising:
   receiving a first instruction set from a first virtual machine (VM), the first instruction set including input and a request to perform a graphics operation on the input;
   generating a first identifier for the first instruction set based upon the input and the graphics operation received within the first instruction set from the first VM;
   instructing a processing unit to perform the graphics operation on the input;
   receiving output from the processing unit resulting from the processing unit performing the graphics operation on the input;
   storing a mapping of the first identifier to a stored copy of each of the input, the graphics operation, and the output;
   returning the output to the first VM in response to receiving the first instruction set;
   receiving a second instruction set from a second VM, the second instruction set including the input and another request to perform the graphics operation on the input;
   generating a second identifier for the second instruction set based upon the input and the graphics operation received within the second instruction set from the second VM;
   determining that the second identifier matches the stored first identifier;
   determining, in response to the determination that the second identifier matches the stored first identifier, whether the input and the graphics operation of the first instruction set received from the first VM matches the input and the graphics operation of the second instruction set received from the second VM; and
   returning the stored copy of the output to the second VM in response to receiving the second instruction set and the determination that the input and the graphics operation matches between the first and second instruction sets.

2. The computer-implemented method of claim 1, wherein generating the first identifier includes hashing the input and the graphics operation.

3. The computer-implemented method of claim 1, wherein the first instruction set includes a plurality of other operations, the method further comprising:
   determining that the input and the graphics operation are treated separately from the plurality of other operations, wherein the generation of the first identifier is not based upon the plurality of other operations.

4. The computer-implemented method of claim 1, wherein:
   the first instruction set includes a first plurality of operations;
   the generation of the first identifier includes hashing the input and the first plurality of operations;
   the first identifier is mapped to a stored copy of the input, first plurality of operations, and the output;
   the instructing of the processing unit includes instructing the processing unit to perform the first plurality of operations received within the first instruction set;

the output received from the processing unit results from the processing unit performing the first plurality of operations;
the second instruction set also includes the first plurality of operations; and
the generation of the second identifier includes hashing the input and the first plurality of operations received within the second instruction set.

5. The computer-implemented method of claim 4, further comprising:
determining that the second instruction set includes a second plurality of operations;
generating a third identifier based upon the second plurality of operations received within the second instruction set; and
determining that the third identifier matches a stored fourth identifier that was generated based upon the second plurality of operations being received within the first instruction set, wherein the stored output returned to the second VM resulted from the processing unit performing the first plurality of operations and the second plurality of operations.

6. The computer-implemented method of claim 4, further comprising:
determining that the second instruction set includes a second plurality of operations;
storing the input and the first plurality of operations from the second instruction set in response to determining that the second instruction set includes a second plurality of operations;
generating a third identifier based upon the second plurality of operations received within the second instruction set;
determining that the third identifier does not have a matching stored identifier generated based operations being received within the first instruction set;
instructing a processing unit to perform the stored first plurality of operations and the second plurality of operations from the second instruction set in response to determining that the third identifier does not have a matching stored identifier; and
returning, to the second VM, an output resulting from the processing unit performing the first and second pluralities of operations from the second instruction set along with the copy of the stored output mapped to the first identifier.

7. The computer-implemented method of claim 1, wherein the first instruction set includes a plurality of operations and wherein the second instruction set also includes the plurality of operations, the method further comprising:
generating a third identifier for the plurality of operations from the first instruction set;
storing a copy of the third identifier;
instructing a processing unit to perform the plurality of operations on the input, wherein the output from the processing unit further results from the processing unit performing the plurality of operations on the input;
generating a fourth identifier for the plurality of operations from the second instruction set; and
determining that the fourth identifier matches the stored third identifier, wherein returning the copy of the stored output is further in response to the determination that the fourth identifier matches the third identifier.

8. The computer-implemented method of claim 1, wherein the input is graphics data and the graphics operation is an application programming interface (API) call.

9. A non-transitory computer-readable medium storing instructions, which when executed by a processing device, cause the processing device to perform a method of sharing graphics operation outputs among a plurality of virtual machines running on a host machine comprising:
receiving a first instruction set from a first virtual machine (VM), the first instruction set including input and a request to perform a graphics operation on the input;
generating a first identifier for the first instruction set based upon the input and the graphics operation received within the first instruction set from the first VM;
instructing a processing unit to perform the graphics operation on the input;
receiving output from the processing unit resulting from the processing unit performing the graphics operation on the input;
storing a mapping of the first identifier to a stored copy of each of the input, the graphics operation, and the output;
returning the output to the first VM in response to receiving the first instruction set;
receiving a second instruction set from a second VM, the second instruction set including the input and another request to perform the graphics operation on the input;
generating a second identifier for the second instruction set based upon the input and the graphics operation received within the second instruction set from the second VM;
determining that the second identifier matches the stored first identifier;
determining, in response to the determination that the second identifier matches the stored first identifier, whether the input and the graphics operation of the first instruction set received from the first VM matches the input and the graphics operation of the second instruction set received from the second VM; and
returning the stored copy of the output to the second VM in response to receiving the second instruction set and the determination that the input and the graphics operation matches between the first and second instruction sets.

10. The non-transitory computer-readable medium of claim 9, wherein generating the first identifier includes hashing the input and the graphics operation.

11. The non-transitory computer-readable medium of claim 9, wherein the first instruction set includes a plurality of other operations, the method further comprising:
determining that the input and the graphics operation are treated separately from the plurality of other operations, wherein the generation of the first identifier is not based upon the plurality of other operations.

12. The non-transitory computer-readable medium of claim 9, wherein:
the first instruction set includes a first plurality of operations;
the generation of the first identifier includes hashing the input and the first plurality of operations;
the first identifier is mapped to a stored copy of the input, first plurality of operations, and the output;
the instructing of the processing unit includes instructing the processing unit to perform the first plurality of operations received within the first instruction set;
the output received from the processing unit results from the processing unit performing the first plurality of operations;

the second instruction set also includes the first plurality of operations; and the generation of the second identifier includes hashing the input and the first plurality of operations received within the second instruction set.

13. The non-transitory computer-readable medium of claim 12, the method further comprising:

determining that the second instruction set includes a second plurality of operations;

generating a third identifier based upon the second plurality of operations received within the second instruction set; and determining that the third identifier matches a stored fourth identifier that was generated based upon the second plurality of operations being received within the first instruction set, wherein the stored output returned to the second VM resulted from the processing unit performing the first plurality of operations and the second plurality of operations.

14. The non-transitory computer-readable medium of claim 12, the method further comprising:

determining that the second instruction set includes a second plurality of operations;

storing the input and the first plurality of operations from the second instruction set in response to determining that the second instruction set includes a second plurality of operations;

generating a third identifier based upon the second plurality of operations received within the second instruction set;

determining that the third identifier does not have a matching stored identifier generated based operations being received within the first instruction set;

instructing a processing unit to perform the stored first plurality of operations and the second plurality of operations from the second instruction set in response to determining that the third identifier does not have a matching stored identifier; and returning, to the second VM, an output resulting from the processing unit performing the first and second pluralities of operations from the second instruction set along with the copy of the stored output mapped to the first identifier.

15. The non-transitory computer-readable medium of claim 9, wherein the first instruction set includes a plurality of operations and wherein the second instruction set also includes the plurality of operations, the method further comprising:

generating a third identifier for the plurality of operations from the first instruction set;

storing a copy of the third identifier;

instructing a processing unit to perform the plurality of operations on the input, wherein the output from the processing unit further results from the processing unit performing the plurality of operations on the input;

generating a fourth identifier for the plurality of operations from the second instruction set; and determining that the fourth identifier matches the stored third identifier, wherein returning the copy of the stored output is further in response to the determination that the fourth identifier matches the third identifier.

16. The non-transitory computer-readable medium of claim 9, wherein the input is graphics data and the graphics operation is an application programming interface (API) call.

17. An apparatus comprising:

a processing device, wherein the processing device executes instructions that cause the apparatus to perform a method of sharing graphics operation outputs among a plurality of virtual machines running on a host machine comprising:

receiving a first instruction set from a first virtual machine (VM), the first instruction set including input and a request to perform a graphics operation on the input;

generating a first identifier for the first instruction set based upon the input and the graphics operation received within the first instruction set from the first VM;

instructing a processing unit to perform the graphics operation on the input;

receiving output from the processing unit resulting from the processing unit performing the graphics operation on the input;

storing a mapping of the first identifier to a stored copy of each of the input, the graphics operation, and the output;

returning the output to the first VM in response to receiving the first instruction set;

receiving a second instruction set from a second VM, the second instruction set including the input and another request to perform the graphics operation on the input;

generating a second identifier for the second instruction set based upon the input and the graphics operation received within the second instruction set from the second VM;

determining that the second identifier matches the stored first identifier;

determining, in response to the determination that the second identifier matches the stored first identifier, whether the input and the graphics operation of the first instruction set received from the first VM matches the input and the graphics operation of the second instruction set received from the second VM; and returning the stored copy of the output to the second VM in response to receiving the second instruction set and the determination that the input and the graphics operation matches between the first and second instruction sets.

18. The apparatus of claim 17, wherein generating the first identifier includes hashing the input and the graphics operation.

19. The apparatus of claim 17, wherein:

the first instruction set includes a first plurality of operations;

the generation of the first identifier includes hashing the input and the first plurality of operations;

the first identifier is mapped to a stored copy of the input, first plurality of operations, and the output;

the instructing of the processing unit includes instructing the processing unit to perform the first plurality of operations received within the first instruction set;

the output received from the processing unit results from the processing unit performing the first plurality of operations;

the second instruction set also includes the first plurality of operations; and the generation of the second identifier includes hashing the input and the first plurality of operations received within the second instruction set.

20. The apparatus of claim 17, the method further comprising:
- determining that the second instruction set includes a second plurality of operations;
- storing the input and the first plurality of operations from the second instruction set in response to determining that the second instruction set includes a second plurality of operations;
- generating a third identifier based upon the second plurality of operations received within the second instruction set;
- determining that the third identifier does not have a matching stored identifier generated based operations being received within the first instruction set;
- instructing a processing unit to perform the stored first plurality of operations and the second plurality of operations from the second instruction set in response to determining that the third identifier does not have a matching stored identifier; and
- returning, to the second VM, an output resulting from the processing unit performing the first and second pluralities of operations from the second instruction set along with the copy of the stored output mapped to the first identifier.

* * * * *